April 12, 1932. H. FOUGNER 1,853,266
RAMP
Filed May 21, 1930 5 Sheets-Sheet 1
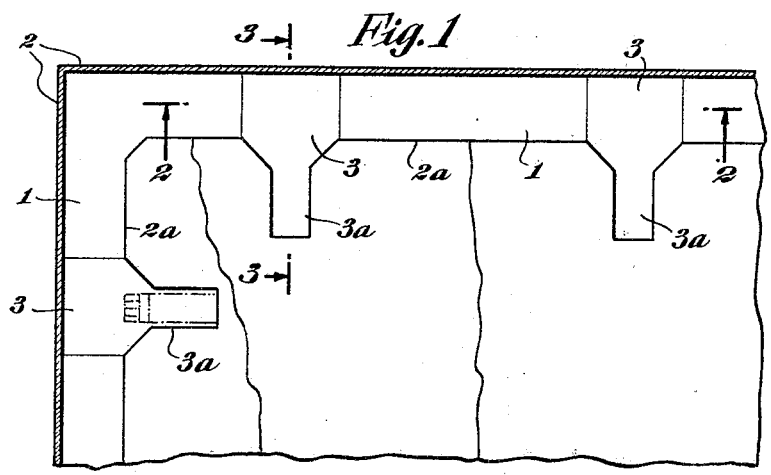
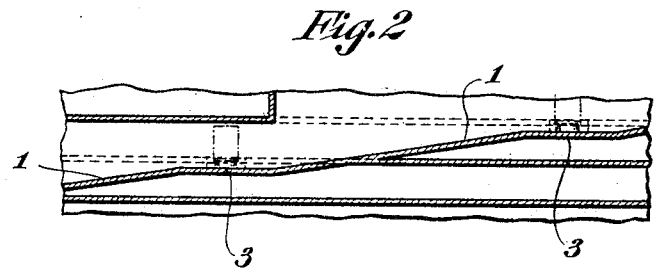
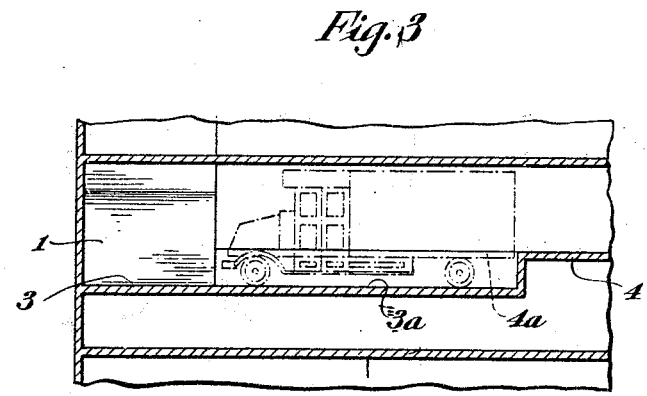
INVENTOR
Hermann Fougner
BY
O. V. Thule
ATTORNEY April 12, 1932.　　　H. FOUGNER　　　1,853,266
RAMP
Filed May 21, 1930　　　5 Sheets-Sheet 2

INVENTOR
Hermann Fougner
BY
O. V. Thrue
ATTORNEY

April 12, 1932.  H. FOUGNER  1,853,266
RAMP
Filed May 21, 1930  5 Sheets-Sheet 3

INVENTOR
Hermann Fougner
BY
O. V. Thiele
ATTORNEY

April 12, 1932.　　　H. FOUGNER　　　1,853,266
RAMP
Filed May 21, 1930　　　5 Sheets-Sheet 4

INVENTOR
Hermann Fougner
BY
O. V. Thiele
ATTORNEY

April 12, 1932. H. FOUGNER 1,853,266
RAMP
Filed May 21, 1930    5 Sheets-Sheet 5

Patented Apr. 12, 1932

1,853,266

UNITED STATES PATENT OFFICE

HERMANN FOUGNER, OF LARCHMONT, NEW YORK

RAMP

Application filed May 21, 1930. Serial No. 454,360.

The invention relates to vehicle ramps for buildings and has for its purpose the provision of such structures with certain improvements which will appear more clearly from the following specification.

Figure 4:
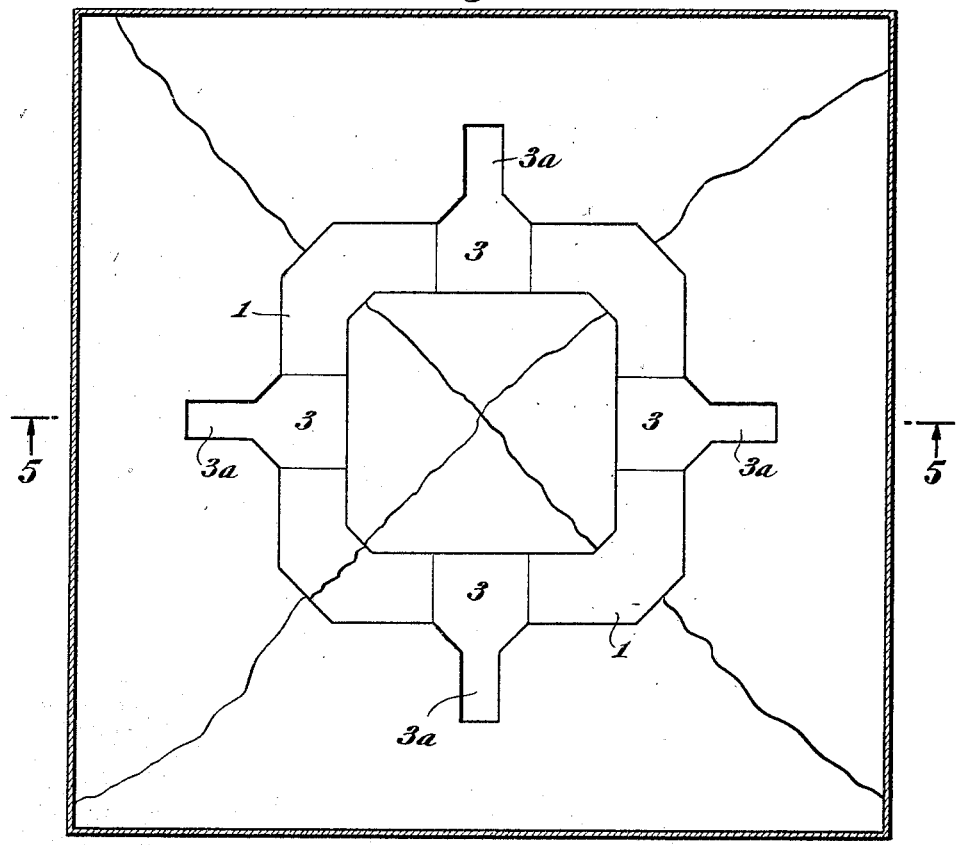
Figure 5:
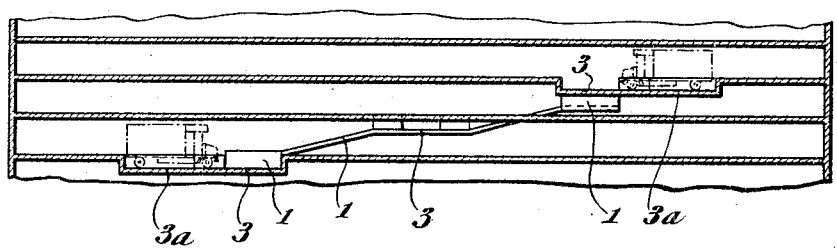
Figure 6:
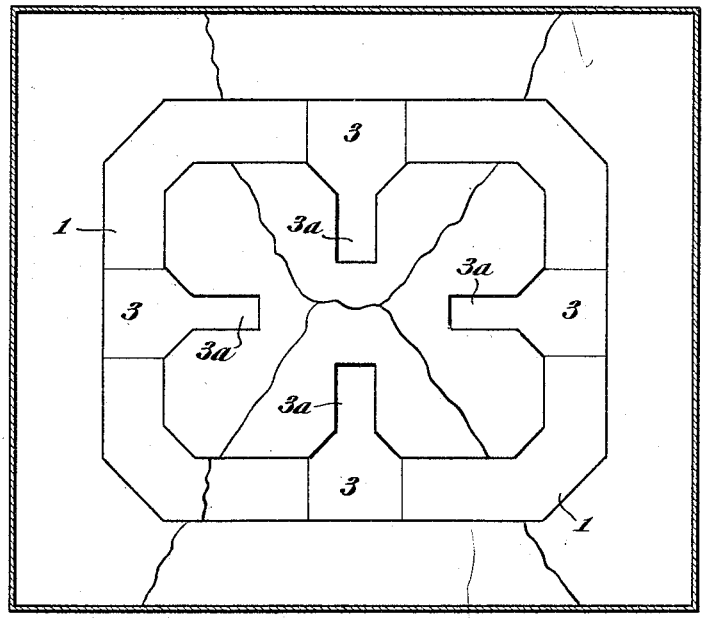
Figure 7:
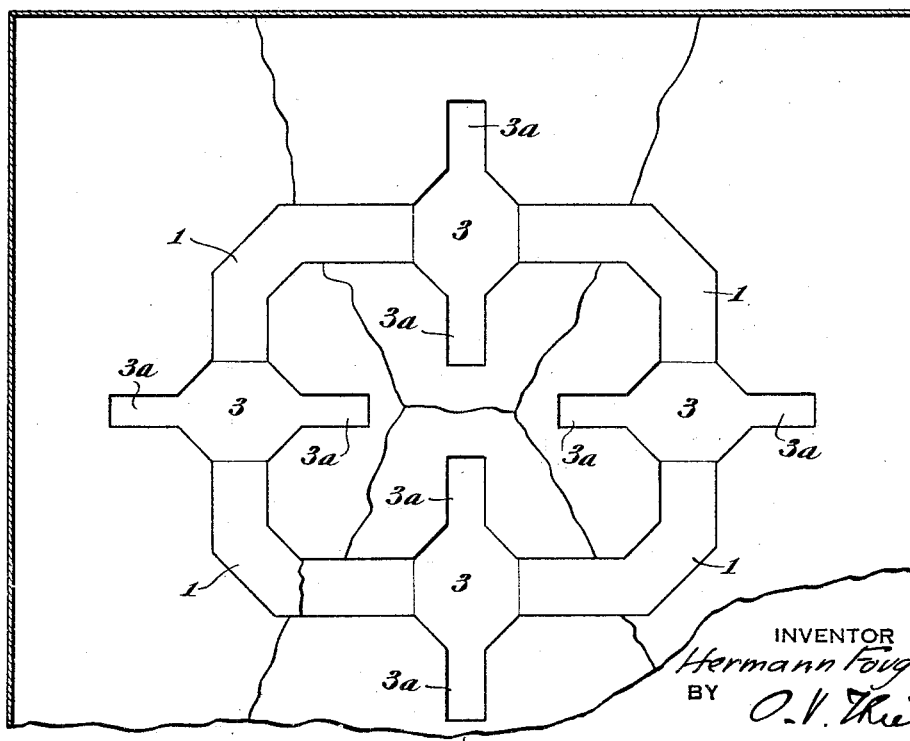
Figure 8:
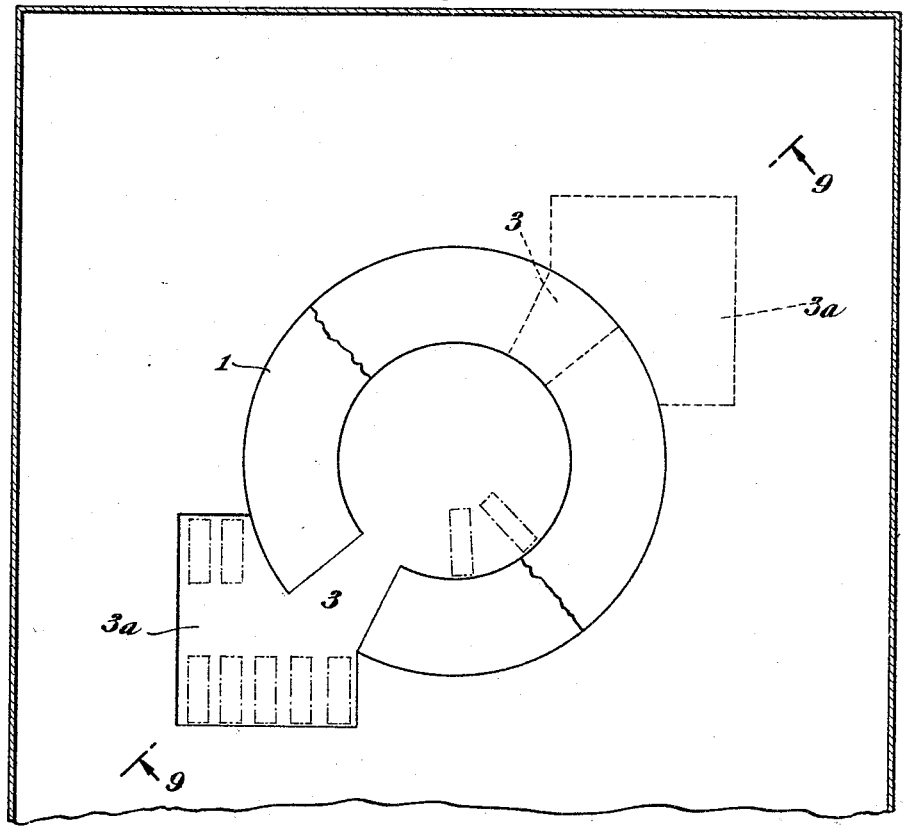
Figure 9:
Figure 10:
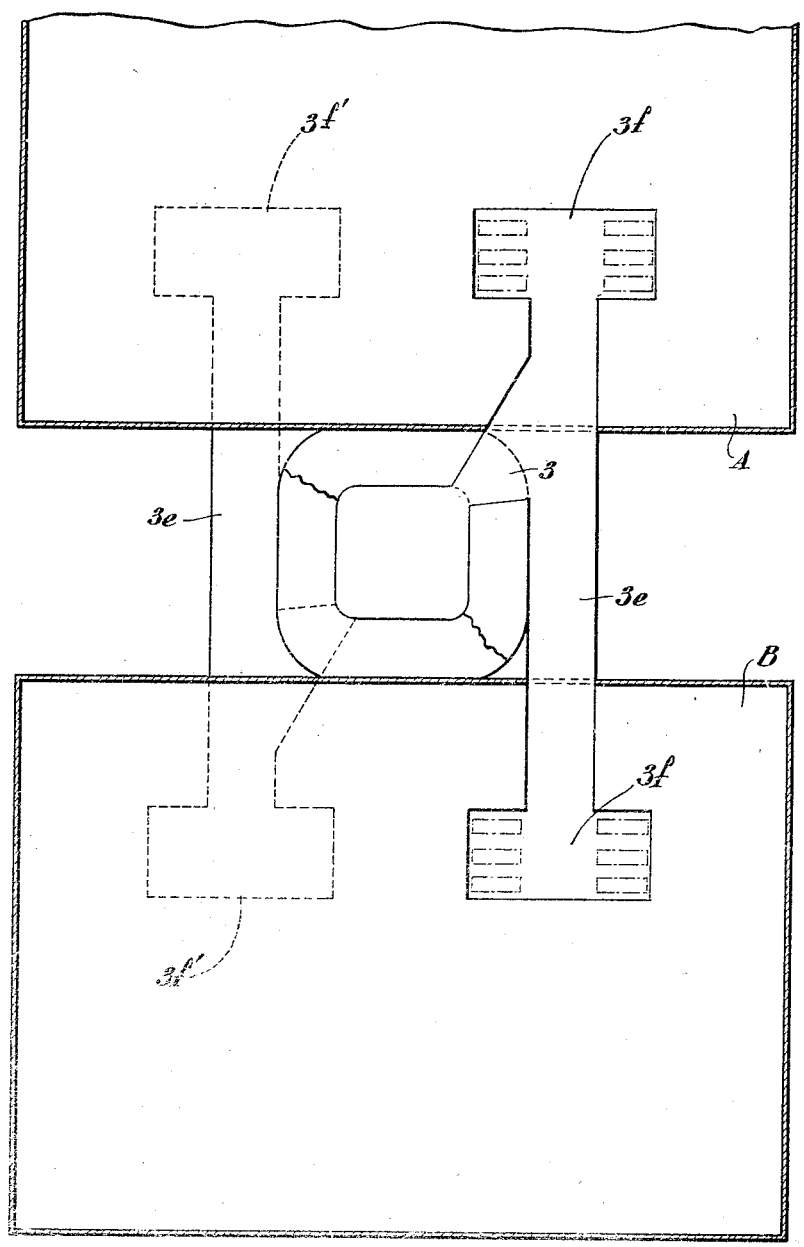

The invention is illustrated in the drawings filed herewith in which Fig. 1 is a fragmentary plan view of a ramp embodying my invention; Fig. 2 is a section on line 2—2 of Fig. 1 looking in the direction of the arrows; Fig. 3 is a view on line 3—3 of Fig. 1; Fig. 4 is a plan view of a ramp arranged around the four sides of a square or rectangle in a building; Fig. 5 is a section on line 5—5 of Fig. 4; Figs. 6 and 7 are plan views similar to Fig. 4 illustrative of modifications; Fig. 8 is a further plan view illustrating additional features and a modification; Fig. 9 is a section on line 9—9 of Fig. 8; and Fig. 10 is a plan view illustrating my invention applied to neighboring or twin buildings.

The idea of using ramps in buildings for taking automobiles, trucks, and other vehicles from floor to floor in buildings under their own power is of course not novel and buildings with such ramps have been constructed in numerous instances. My invention has particular reference to ramps by which trucks are to be taken from floor to floor and unloaded and loaded at any desired floors. With ramps as hitherto constructed the trucks stop for any given floor on the floor level. Inasmuch as trucks are commonly higher than the heights necessary between floors in buildings used for storage of merchandise or for manufacturing (to which class of buildings my invention has special reference), it has been necessary in the past to space the floors in cases where trucks are to be loaded and unloaded in this way further apart than would normally be required. This involves very large extra building costs, and one of the purposes of my invention is to make it possible to keep the floors spaced apart by distances dictated by considerations other than the truck heights. Such spacing for buildings of the type to which my invention may advantageously be applied is normally about 10 ft. whereas truck heights are commonly 12 ft. or over. The provision I make for accomplishing this purpose results at the same time in other highly desirable advantages as will presently appear.

Referring to Fig. 1, the ramp is illustrated at 1 and is shown as following around the outside wall 2 of the building. At spaced intervals are preferably provided flat areas 3—3 which are extended as at 3a to provide spaces into which trucks are backed for loading and unloading. The areas 3 and the spaces 3a are, as will be noted from an inspection of Figs. 2 and 3, below the floors which they are to serve, the amount by which they are depressed below their floors being such that the trucks can pass on to the spaces 3a without striking the floor above. At the same time this sinking of the areas 3 and spaces 3a below the associated floors brings the floor of the truck approximately on a level with the building floor. This will be clear from an inspection of Fig. 3, where the truck floor 4a is substantially on a level with the building floor 4. Thus by depressing the areas 3 and spaces 3a the two ends are accomplished that trucks of heights greater than the spacing of the floors can be brought to the floors for loading and unloading, and that the loading and unloading operations are facilitated by having truck floor and building floor flush or approximately so.

It will be clear that the areas 3 need not necessarily be made horizontal or flat but that this is more convenient than leaving them with a slope.

The horizontal distance between one area 3 and the next one will of course depend upon the height of the stories and the pitch given the ramp. Each of the areas 3 in Fig. 1 is intended to be one floor above or below the preceding one.

It will be clear that while in the above it has been assumed that the ramp is within the building, or in other words that 2—2 is the outside building wall, the ramp might equally well be outside of the building and 2a—2a may be the outside wall of the building. In such case the ramp may, if desired, be closed in or left open.

Referring next to Fig. 4, the ramp is here shown as extending around a square or rectangle. In other respects the arrangement is quite similar to that of Fig. 1. The path of the ramp will hereinafter be called helical whether the projected form is circular, as in the form of Fig. 8, or rectangular, as in some of the other forms. The ramp 1 has a continual pitch except at the areas 3 which are again preferably made level and from these areas 3 extend outward the extensions 3a. These areas 3 are again depressed below the floor levels as illustrated more clearly in Fig. 5. It will be unnecessary to enter into any further detailed description as this matter will be entirely clear from what has already been said. The ramp will of course run around the square as often as required by the number of floors in the building.

Instead of having the extensions 3a on the outer side of the square as in Fig. 4, they may evidently be on the inner side as illustrated in Fig. 6 or they may be on both sides as shown in Fig. 7. When they extend inward, as in Fig. 6, the ramp may be within the building or may lie outside of the building walls, as described in connection with Fig. 1, or it may lie partly within and partly without the building walls.

In practice, the ramp is built of such width that trucks going down can pass trucks going up and the size of the square or rectangle around which the ramp is built is large enough to take care of the ordinary turning radius used by trucks.

In all cases, the spaces 3a may evidently be made of a width great enough to accommodate more than one truck at the same time.

In Fig. 8 is shown a form which I now regard as the most practical one.

The ramp is here given a circular shape in projection, and the spaces 3a, which it will be understood are here also sunk below the corresponding floor levels, are shown considerably enlarged so that a number of trucks can be accommodated simultaneously in each of them.

It is assumed in the illustration of Fig. 8 that a truck in circling through 180° on the ramp has reached the floor above or below. Evidently by varying the diameter of the ramp or its pitch, the next floor can be reached by going through only a third of the circle or a fourth, or some other fraction. Furthermore, the several areas 3a need not lie in vertical lines above each other at all, but may occur at such intervals around the circle that no two lie directly above each other. The form illustrated, however, is a very compact and advantageous one and gives ample radius for turning. It will be obvious that in no case must an area 3a be directly above or below the area 3a of adjacent floors as this would leave only the normal story height for the loading area and would defeat one of the purposes of the invention. This would be permissible only where the added height is of no interest, and where it would be desirable only to bring the floor of the vehicle substantially on a level with the building floor.

The space within the square, rectangle, or circle of the ramp is of course not waste space. There are several ways in which it can be utilized. If desired, such space can, in those cases where the loading spaces 3a are on the outside, be left entirely open as an airshaft. This will ordinarily be too large a space for this purpose, and part of it may be used for an elevator or a bank of elevators. Usually, however, I contemplate placing floors in the space. These may, if desired, be continuous with the building floors, and it will be clear that these portions of the floors will be accessible everywhere except where the ramp is located. At these points only enough of each floor is broken away to accommodate the ramp and provide room for the passage of the trucks.

Any desired number of the floors in the central area can be set aside for the storage of cars or trucks. These central spaces are in that case preferably walled off by vertical walls along the inside of the ramp and doors for entry from the ramp are provided at the proper places. In Fig. 9 is shown a vertical section of Fig. 8, illustrating this idea. The floors appear at A B C—H, and are shown as equally spaced. At floor A the building floor is shown as continued into the central space. This may, if desired, be done with all of the floors. At floors B C and D the flat areas rather than the building floors are extended into the central space. This may be the arrangement adopted for the entire central space, if desired. The floors in the central space will then be spaced apart vertically the same distance as the building floors but will be below them. The central spaces are accessible directly from the flat areas through suitable doors and can be used to store cars of ordinary size or for any other purpose.

Floors E F G and H illustrate an arrangement of the floors in the central space making them available for storage of trucks. Alternate floors of the central space, in this case, are on a level with the corresponding flat areas while the intervening ones are on a level with the main building floors. Thus for the floors F and H the central floors are flush with the flat areas, while for floors E and G they are flush with the main building floors. Trucks can be run on the central floors F and H as the requisite headroom has been provided. The central floors E and G, with their small headroom, can still be used for storage or similar purposes. If desired this arrangement can be used throughout the height of the building.

It will be understood that fire-doors will be installed in practice where required to close off the central spaces from the ramp.

These uses of the central space are illustrative only. They show that in general the space is not wasted and that the floors can be placed in it as desired, and that they may be spaced quite independently of the building floors.

It will be seen that in all of the forms, cars or trucks may be stored, for instance over night, in the loading spaces, in which case suitable fire-doors may be provided between the ramp and the loading spaces.

By placing the ramp between two buildings A and B as illustrated in Fig. 10, it can be made to serve both buildings as will be evident at once from an inspection of the figure. The area 3 is connected by the passageways 3e—3e of any necessary length, to the loading spaces 3f—3f in the two buildings. Ordinarily, all of the passages 3e—3e and areas 3f—3f will be exactly or approximately on the same level. Obviously, however, the floors in the two buildings may not be on the same level and the connecting ways 3e—3e will then slope a little as required. It is here also assumed that the next floor is reached by a car traveling half around the ramp so that the loading spaces 3f'—3f' are on the next floor above or below the areas 3f—3f.

In practice it is generally desirable to have a central curb to separate the down traffic from the up traffic. Obviously this can be used in connection with my invention, such curb being broken away at the spaces 3. Furthermore, my invention lends itself just as well as the ordinary ramps to the arrangement in which the up traffic is on a ramp of just the opposite slope from the down traffic. In such case the two ramps intersect at the areas 3.

It is desired at times to run low vehicles directly to various parts of the floors from the ramp as, for instance, for the distribution or collection of goods. My improved ramp does not interfere with this in any way. All that is required is the provision of suitable openings from the ramp to such floors. This is illustrated in Fig. 9 where the door 5 opens from the ramp to floor C at the level of that floor.

It will be quite evident that further variations can be introduced into this invention without departing from its spirit. Thus, the form of Fig. 8 might, instead of being circular in projection, be oval, or have two straight portions and semi-circular end portions.

I claim:

1. In a building, the combination of a plurality of floors each spaced from that above it less than the height of trucks loading and unloading at them, a ramp extending from floor to floor in a helical path and rising for each complete turn of the helix a distance equal at least to a truck height, and a loading area associated with each floor accessible for said trucks from the ramp and depressed sufficiently below the floor so that said trucks can run into the area without striking the floor above.

2. The combination according to claim 1, the ramp having horizontal portions each continuous with a loading area, the space inside of the ramp having a plurality of floors each alined with one of said horizontal ramp portions.

3. The combination according to claim 1, the space inside of the ramp having a plurality of floors alined with alternate building floors and floors between the first-named floors alined with the loading areas associated with the intervening ones of said plurality of building floors.

4. The combination according to claim 1, means being further provided for access by small cars directly to the floors from the ramp.

5. The combination of two neighboring buildings each having floors spaced apart less than the height of trucks servicing them, a ramp adjacent to both buildings for said trucks extending from the ground past a plurality of floors of the buildings, a loading area associated with each of said floors, said loading area being depressed below the floors by an amount sufficient to let said trucks pass onto the loading areas without striking the floor above, and passageways for said trucks from the ramp to the loading areas.

6. In a building, the combination of two floors spaced apart vertically less than the maximum height of trucks loading and unloading at the lower floor, a ramp ascending to the lower floor, and a loading area for the lower floor accessible for said trucks from the ramp and depressed below the lower floor by an amount sufficient to allow said trucks to pass onto the said area for loading and unloading without striking the floor above.

7. In a building, the combination of a ramp extending from one floor to the next floor above, and a loading area for the upper floor accessible for vehicles from the ramp and depressed below the upper floor by an amount such that with the vehicle on the area its floor is substantially on a level with the said upper floor of the building.

8. In a building, the combination of a plurality of floors at least some of which are spaced vertically from the next floors above them by a distance less than the height of trucks loading and unloading at them, a ramp intersecting the floors, loading areas associated with said floors and accessible for said trucks from the ramp, each loading area being spaced from the floor next above it sufficiently to let said trucks pass on to it for loading and unloading without striking the floor above.

9. The combination according to claim 8, the ramp having horizontal portions continuous with the loading areas.

10. The combination according to claim 8, the ramp having horizontal portions continuous with the loading areas and each loading area being large enough to accommodate a plurality of said trucks simultaneously.

11. The combination according to claim 8, successive loading areas being out of alignment vertically.

HERMANN FOUGNER.